Sept. 12, 1950 L. AVONDOGLIO 2,522,083
ROTATABLE SEAL FOR COWLINGS
Filed Feb. 27, 1947 3 Sheets-Sheet 1

Inventor
LEO AVONDOGLIO

Attorney

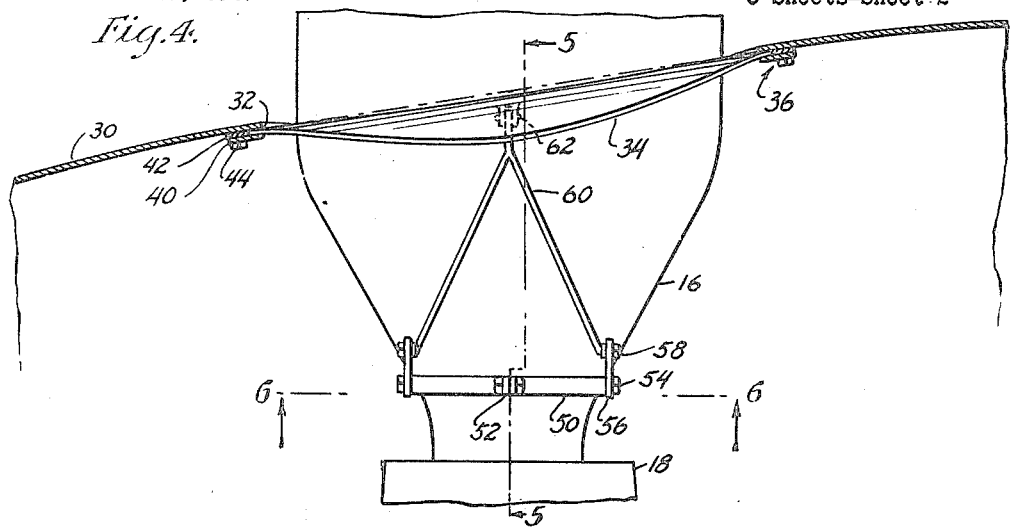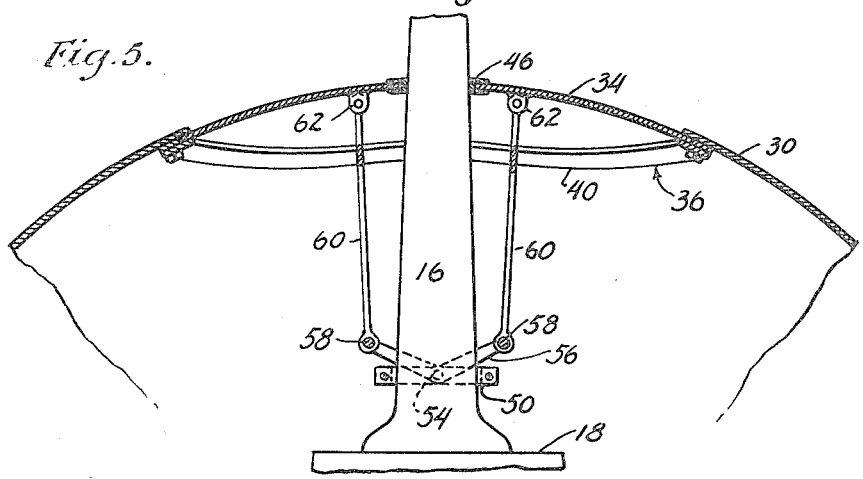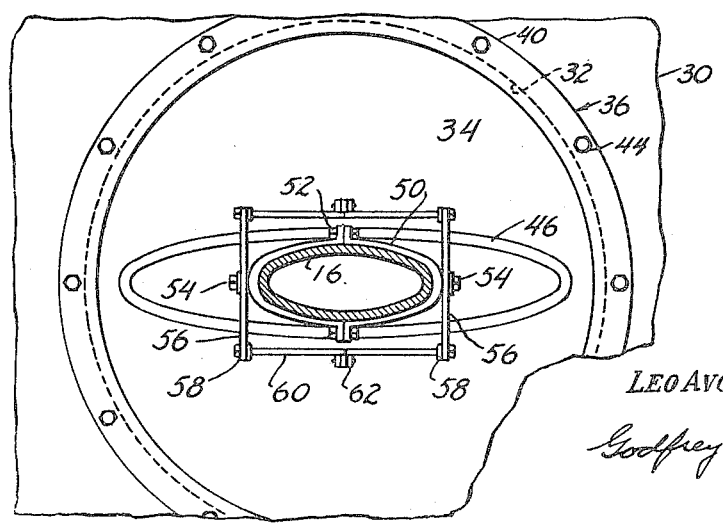

Sept. 12, 1950  L. AVONDOGLIO  2,522,083
ROTATABLE SEAL FOR COWLINGS
Filed Feb. 27, 1947  3 Sheets-Sheet 3

Inventor
LEO AVONDOGLIO
Godfrey B. Speir
Attorney

Patented Sept. 12, 1950

2,522,083

UNITED STATES PATENT OFFICE 2,522,083

ROTATABLE SEAL FOR COWLINGS

Leo Avondoglio, Verona, N. J., assignor to Curtiss-Wright Corporation, a corporation of Delaware Application February 27, 1947, Serial No. 731,385

7 Claims. (Cl. 170—160.23)

This invention relates to rotatable members on curved cowling surfaces, such for instance, as propeller blade fairings or seals on curved aircraft propeller spinners.

This invention comprises in part improvements in the co-pending Dean application, Serial No. 612,460 filed August 24, 1945, now Patent 2,498,072, dated February 21, 1950.

Prior aircraft art comprehends the use of spinners on aircraft propellers which mask the propeller hub and give to it a streamlined form which the hub does not have inherently. In prior types of spinners it has been usual to provide holes through which the propeller blades project; if the spinner is small, the substantially cylindrical shank ends of the propeller blades protrude through the spinner and the spinner openings accordingly may be substantially circular and little or no closure or fairing between the blades and spinner is necessary. Where spinners are of large diameter so as to mask the areodynamically ineffective cylindrical shank portions of the propeller blades, a difficult problem is presented in sealing or fairing the pitched portion of the blade to the spinner and to permit continuous streamlined air flow over the spinner while allowing freedom for pitch change of the propeller blades. While various solutions to this sealing and fairing problem have been suggested, all of which are aimed at reducing aerodynamic drag, most of them are compromises which do not allow smooth air flow over the spinner and over the inner portions of the blades. The copending application above mentioned does provide a smooth blade to spinner seal arrangement wherein a flexible, compoundly curved disc embraces the propeller blade and is rotatably engaged in a circular compoundly curved track in a portion of the spinner. This arrangement requires that the seal disc be distortable for compound curvature along different axes. The present arrangement provides improvements, in that the blade to spinner seal may be a flat flexible disc which in operation will have only simple curvature—that is, the disc is so curved as to be a portion of a cylindrical or conic surface rather than a portion of a compound curved surface.

An object of the invention is to provide a blade to spinner seal, permitting of pitch change freedom of the blade while retaining nearly perfect streamlined configuration for the spinner. A further object is to provide a simply curved spinner or cowling seal which is capable of rotation in the spinner or cowling and which is capable of warpage along different axes during its rotation in the spinner or cowling. A further object of the invention is to provide reinforcing means for a rotatable spinner seal to support the seal at least in part against centrifugal force when the seal is subject thereto. Another object of the invention is to provide a flexible circular seal element for a port in a cowling or body which may be initially formed as a circular, flat disc.

Further objects of the invention will become apparent in reading the annexed detailed description in connection with the drawings which exemplify two arrangements of the spinner or seal along with several embodiments of reinforcing means applicable thereto. The drawings and description are not to be considered as limiting the scope of the invention, the specific improvements which comprise the invention being set forth in the appended claims. The provisions of the invention may be applied to a variety of structures, both rotatable and non-rotatable, and the details of the invention may be modified in accordance with specific environments with which the provisions of the invention are adapted for use.

In the drawings in which similar reference characters indicate similar parts, Fig. 1 is a longitudinal schematic section through an aircraft propeller and spinner showing the provisions of the invention;

Fig. 4 is a fragmentary longitudinal section through a portion of a spinner, showing the invention in greater detail;

Fig. 5 is a section on the line 5—5 of Fig. 4;

Fig. 6 is a section on line 6—6 of Fig. 4;

Figure 1:
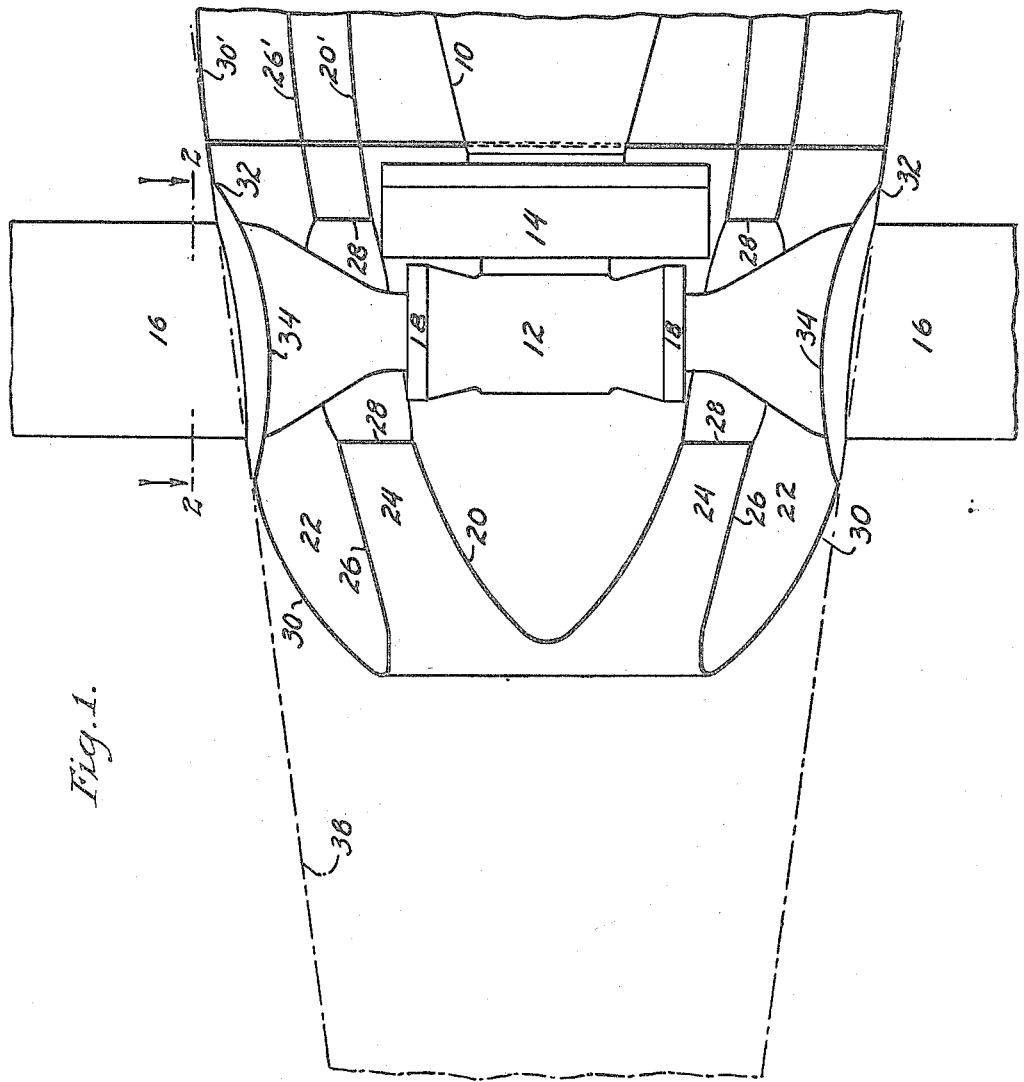
Figure 2:
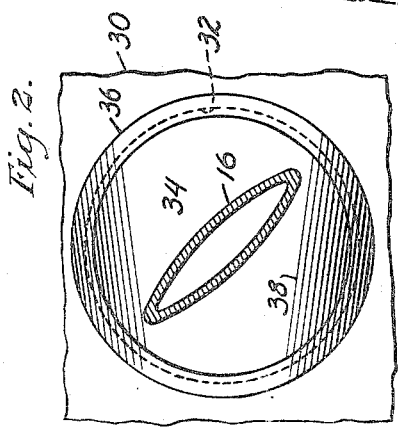
Figs. 2 and 3 are fragmentary sections on the line 2—2 of Fig. 1, showing the propeller blade and seal in different positions of adjustment.
Figure 3:
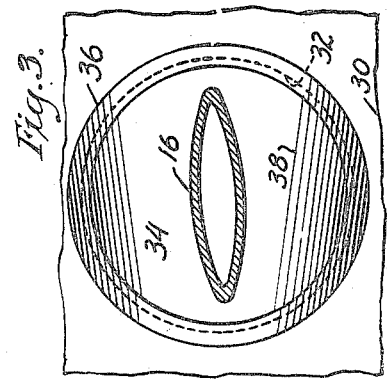

Referring first to Figs. 1, 2 and 3, I show a power plant nose 10 upon which is mounted on a suitable shaft, not shown, a propeller hub 12, the hub having a pitch changing mechanism 14 and having a plurality of blades 16 extending from blade sockets 18 integral with the propeller hub. The types of hub and pitch change mechanism are not material to the invention and any of the various known types may be used. Embracing and rotatable with the hub 12 proper is an inner spinner 20 and around this is disposed a rotatable outer spinner 22 defining with the inner spinner 20 a coaxial annular air duct 24 through which ambient air may enter and pass to a power plant or other apparatus requiring air. The outer spinner 22 comprises an inner portion 26; between this portion 26 and the spinner 20 are secured radially disposed hollow cuffs or channels 28, streamlined and neutrally pitched with respect to air flowing through the duct 24. The blades 16 pass outwardly through the cuffs. The outer spinner 22 also comprises an outer streamlined cowling portion 30 through which the blades 16 pass, this opening being identified at 32. Stationary cowl elements 20', 26' and 30' extend rearwardly from the elements 20, 26 and 30 respectively, to carry the spinner form and air duct 24 rearwardly.

Since the blades are capable of pitch change from a feathering position such as that shown in Fig. 3 to a reverse pitch position through the normal pitch range exemplified in Fig. 2, the blade pitch range being of the order of 120°, it is essential that the opening 32 have sufficient clearance around the blade 18 for this pitch changing movement. An opening to allow blade freedom is ordinarily so large as to present substantial drag if it is not faired or sealed. Accordingly, I provide a sealing closure 34 in the form of a thin flexible planar disc having an opening therein which is shaped to the propeller blade profile and which fits closely to the surface of the propeller blade. The cowl 30 adjacent the opening 32 is formed as a conic surface and is provided with a track 36 likewise formed as a conic surface within which the disc 34 is rotatably engaged. The track 36 lies in a conic surface of revolution about the propeller axis and the opening 32 is circular when the conic surface is developed into a flat surface. The disc 34, being circular, flexible and flat, may be simply curved as a conic surface of a revolution to engage the track 36, the disc 34 being rotatable in said track. During disc rotation relative to the track 36, the conic elements of the disc will continue to lie in the conic surface of the cowling, in track 36, the conic elements being shown in dotted lines at 38.

Since the blade 16 passes through and engages the disc 34, turning of the blades in pitch change will enforce disc rotation in the track 36. The disc will warp during turning to maintain a conic curvature which at all times lies in the envelope of the conic curvature of the track 36 and adjacent parts of the spinner 30. The flexibility of the disc material permits warpage of the disc about different chords while it is being turned.

Figure 7:
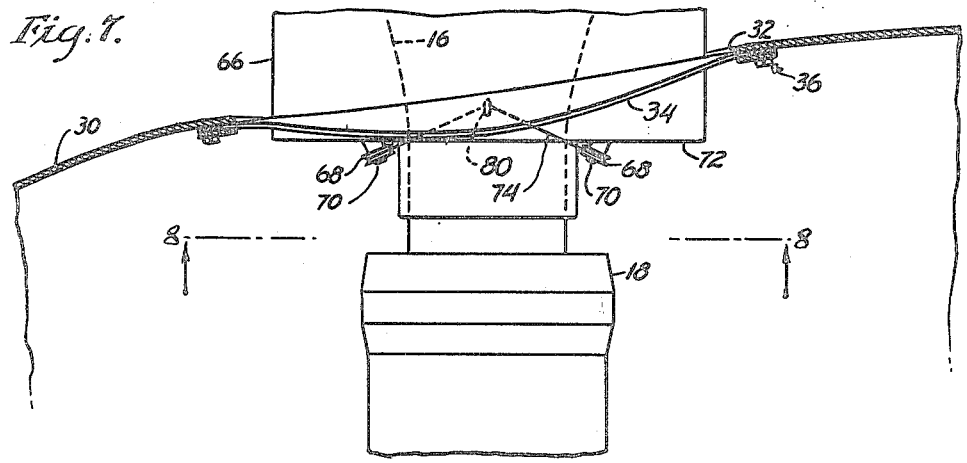
Fig. 7 is a fragmentary longitudinal section through an alternative arrangement of spinner.
Figure 8:
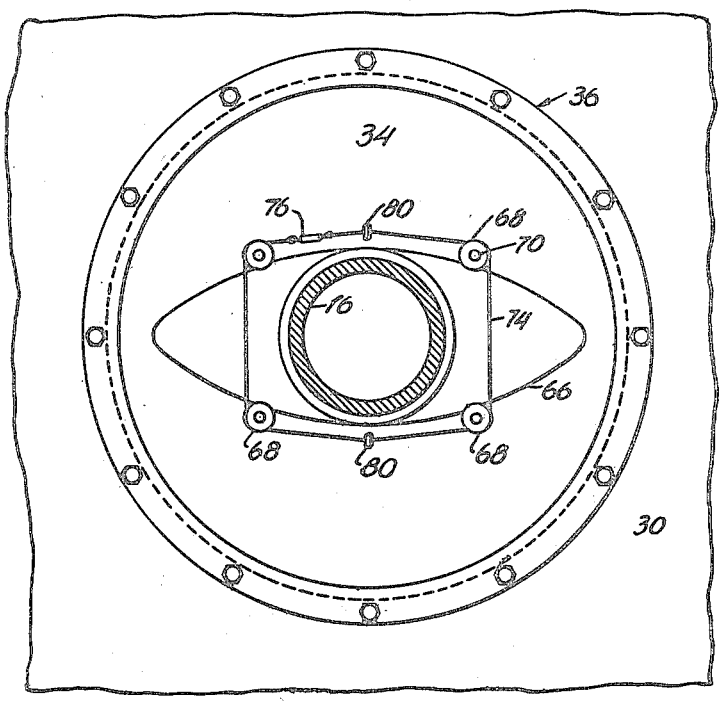
Fig. 8 is a section on the line 8—8 of Fig. 7.

Ordinarily a spinner or cowling of the character shown is compounded in its curvature to attain optimum streamlining. To practice this invention however, the portions of the cowling adjacent the track 36 will be preformed to a conic surface which will deviate only slightly from the compounded curvature of the balance of the cowling. While the type of spinner shown includes the air entrance duct 24, the invention may also be used with simple unducted spinners. Relevant portions of a simple spinner are shown in Figs. 7 and 8, which will be described shortly.

Figs. 4, 5 and 6 show the heretofore described arrangement in somewhat greater detail wherein the track 36 may comprise a wide ring 40 and a narrow ring 42, the two rings being secured to the cowling 30 concentric with the opening 32 therein as by bolts or rivets 44. The disc is rotatable between the ring 40 and the edge of the cowling 30 at the opening 32. The opening in the disc 34 through which the blade 16 passes may be provided if desired with a resilient grommet 46 to prevent chafing of the blade and disc against one another. It will be appreciated that as the blade changes pitch, there will be relative sliding in a radial direction between the blade and the portions of the disc 34 adjacent thereto so that the grommet 46 serves as a wear or chafing strip as well as serving as a seal to minimize leakage of air between the blade and disc.

The disc 34 preferably is thin, light and strong and may be cut from sheet material such as stainless steel or Duralumin. Its proper fairing form in operation is preserved by its engagement with the track 36, and because of its light weight, the force of its engagement with the track 36 under the influence of centrifugal force is minimized. The curvature of the disc gives it inherent stiffness against unwanted distortion.

Where the disc of this invention is applied to a propeller spinner subject to the effects of centrifugal force, and where the blade is fairly large, points near the center of the disc 34 and the disc portions adjacent the thrust and camber surfaces of the propeller blades are not directly supported and conceivably may be displaced outwardly by centrifugal force during propeller rotation. Such outward displacement might so distort disc 34 as to bind it in its track 36, preventing it from free turning even though the disc is predominately supported by the track 36. Figs. 4 through 8 show alternative arrangements for supporting the disc against outward displacement, in addition to the support afforded by track 36.

In Figs. 4, 5 and 6, an arrangement for reinforcing the central parts of the disc 34 is shown which permits relative movement of the disc portions adjacent the camber and thrust faces of the propeller blade but which constrains them against outward displacement due to the effects of centrifugal force. It will be appreciated that as the disc 34 is turned through a substantial angle in the track 36 that the disc portions on opposite sides of the blade will have different degrees of movement as the disc warps.

A clamp band 50 is secured around the shank of the blade 16 just outboard of the blade socket 18, the band comprising two parts secured to one another by bolt and flange joints 52. The ends of the clamp ring 50 in the plane of the leading and trailing edges of the blade are provided with pivots 54 on each of which a rocker arm 56 is freely swingable. The rockers have a length greater than the blade thickness, each rocker end being provided with a pivot 58. Yokes 60 are pivoted at their outer ends to trunnions 62 secured to the disc 34 substantially midway of chord of the propeller blade and close to the thrust face or the camber face of the blade, whichever is applicable. Each yoke is bifurcated and the lower ends thereof are respectively engaged with the rocker arm pivots 58. The two yokes 60, one adjacent each face of the blade, transmit a part of the centrifugal force imposed on the seal disc to the rocker arms 56 so that the forces on the disc on each side of the blade are balanced against one another. However, the disc portions on the two sides of the blade may move relatively to one another through the yoke and rocker arm arrangement.

If the slope of the spinner, the disc 34 and the track 36 is very slight relative to the rotation axis, there will be a very small amount of relative movement of the disc portions adjacent the two faces of the propeller blade as the disc is rotated in the track; but if the slope of the spinner disc and track is steep relative to the rotation axis, there may be a substantial differential movement of the referred to disc portions. In some cases, where the slope of the spinner is very slight, the rocker arm 56 may be dispensed with and single non-adjustable struts may extend from the disc portions to anchorages adjacent the blade shank.

Compensating reinforcing means, to serve the same function as the yoke and rocker arm system of Figs. 4 to 6, may take many different forms. One alternative form is shown in Figs. 7 and 8.

The spinner and propeller arrangement of Figs. 7 and 8 is representative of a system wherein the propeller blade 16 is equipped with a shank cuff 66 which extends a short distance inwardly of the spinner opening 32. The cuff 66 extends through the disc 34 in the same fashion as the blade extended through the disc in the embodiment previously described. In this embodiment, the spinner 30 lies close to the propeller hub blade sockets 18 so that there is relatively small available space between the butt of the cuff 66 and the blade socket for the installation of reinforcing means for the disc 34. To meet this situation, I provide a series of pulleys 68 journalled on pins or pivots 70 which are secured to the butt end 72 of the cuff 66. A cable 74 is reaved around these pulleys, the ends of the cable 74 being secured to one another as by a turnbuckle 76. The runs of the cable 74 along the thrust and camber faces of the cuff 66 are passed through eyes 80 secured to the inner surface of the disc 34 midway between the leading and trailing edges of the cuff and close to the edges of the cutout in the disc 34 adjacent the camber and thrust faces of the cuff. The cable 74 thus restrains the disc against outward displacement and at the same time permits relative inward and outward movement of the portions of the disc lying on either side of the cuff 66.

Various arrangements of the invention disclosed herein are highly effective in providing virtually perfect streamlining for propeller blades extending through the surface of a streamlined spinner. A similar arrangement as is used for a spinner fairing may be used for rotatable members projecting through and beyond a curved body such as an aircraft fuselage, nacelle or wing. The principles of the invention are also deemed applicable to projections extending from curved bodies in general, no limitation being implied as to the scope of the invention by its illustration in connection with aircraft structure.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aeronautical propeller and cowling arrangement, said propeller having blades extending through said cowling for pitch change, substantially circular tracks in the cowling around each blade, warpable substantially circular closure members embracing said blades in clearance relation and movable with said blades and fitted to said tracks, said tracks lying in a conic surface, and said closure members conforming to said conic surface in all pitch positions of said propeller blades, and means separate from said tracks and blades, rotatable with said closure members, for reinforcing said members against displacement due to centrifugal force induced by propeller rotation.

2. In a rotatable cowling for an aeronautical propeller comprising controllable pitch blades, conic surface portions on the cowling adjacent said blades, said portions having circular openings through which said blades pass, closure discs embracing said blades in clearance relation and movable with said blades during pitch change, said discs being warpable, and track means secured to the edges bordering the circular openings in said conic cowling portions, said discs engaging said track means to establish flush fitting engagement between the edges of said discs and the edges of said openings, and devices separate from the blades secured to the propeller and to the central portions of said discs to support said discs, at least in part, against centrifugal force during propeller rotation.

3. In a rotatable cowling for an aeronautical propeller comprising controllable pitch blades, conic surface portions on the cowling adjacent said blades, said portions having circular openings through which said blades pass, closure discs embracing and movable with said blades during pitch change, said discs being warpable, and track means secured to the edges bordering the circular openings in said conic cowling portions, said discs engaging said track means to establish flush fitting engagement between the edges of said discs and the edges of said openings, and devices secured to the propeller and to the central portions of said discs to support said discs, at least in part, against centrifugal force during propeller rotation, said devices comprising articulating means allowing differential movement of portions of said discs during disc rotation in the cowling.

4. In combination, an aeronautical propeller, a substantially conic spinner around the propeller hub having substantially circular openings therein for passage of the propeller blades, plane, flexible disc closures fitted around the blades in clearance relation and engaging and supported predominantly by the edges of the opening, lying substantially flush with the spinner surface and warped to the same curvature as said spinner, and means separate from said blades securing portions of said closures to said propeller against displacement and distortion due to centrifugal force.

5. In combination, an aeronautical propeller, a substantially conic spinner around the propeller hub having substantially circular openings therein for passage of the propeller blades, plane, flexible disc closures fitted around the blades in clearance relation and engaging and supported predominantly by the edges of the opening, lying substantially flush with the spinner surface and warped to the same curvature as said spinner, and means separate from said blades securing portions of said closures to said propeller against displacement and distortion due to centrifugal force, said blades being changeable in pitch and said closures moving with said blades during pitch change and, in so moving, transferring their warp to different portions of the disc surface.

6. In combination, an aeronautical propeller, a curved spinner around the propeller hub having substantially circular openings therein for passage of the propeller blades, warpable closures fitted around the blades in clearance relation and warped to engage the curved edges of the openings, lying substantially flush with the spinner surface, and means separate from said blades securing portions of said closures to said propeller against displacement and distortion due to centrifugal force, said blades being changeable in pitch, said closures being movable with said blades during pitch change and warpable along different portions during such movement, and said securing means comprising elements movably secured to the propeller and closure to allow relative movement of parts of the closure during warping thereof with blade pitch changing movement.

7. In an aeronautical propeller and cowl arrangement, said propeller having a hub and blades extending therefrom through said cowling for pitch change, track-forming means in the cowling disposed in a circular arrangement around each blade, plane warpable substantially circular closure members embracing said blades in clearance relation and movable with said blades as the blades move for pitch change, said members being fitted for rotation in said track-forming means, the warping of said closure members transferring to different portions thereof when said members move relative to the spinner and with said blades, and means separate from said track-forming means and blades engaging said closure members and hub to reinforce them and to prevent their displacement due to centrifugal force induced by propeller rotation.

LEO AVONDOGLIO.

REFERENCES CITED

The following references are of record in the file of this patent:

UNITED STATES PATENTS

| Number | Name | Date |
|---|---|---|
| 1,668,972 | McCauley | May 8, 1928 |
| 2,083,992 | Hall | June 15, 1937 |
| 2,286,341 | Burnelli | June 16, 1942 |
| 2,289,400 | Woods | July 14, 1942 |
| 2,329,606 | Goodman | Sept. 14, 1943 |
| 2,338,950 | Linke | Jan. 11, 1944 |
| 2,498,072 | Dean | Feb. 21, 1950 |

FOREIGN PATENTS

| Number | Country | Date |
|---|---|---|
| 6,879 | France | Mar. 4, 1942 |
| 548,909 | Great Britain | Oct. 29, 1942 |
| 571,989 | Great Britain | Sept. 18, 1945 |
| 882,261 | France | Feb. 22, 1943 |